United States Patent [19]

Maschek et al.

[11] Patent Number: 4,802,731

[45] Date of Patent: Feb. 7, 1989

[54] OPTICAL WAVEGUIDE ARRANGEMENT FOR A HIGH-VOLTAGE INSULATOR

[75] Inventors: Martin Maschek, Würenlos; Georg Mastner, Niederrohrdorf; Branko Tomic, Oberehrendingen, all of Switzerland

[73] Assignee: BBC Brown Boveri AG, Baden, Switzerland

[21] Appl. No.: 111,350

[22] Filed: Oct. 22, 1987

[30] Foreign Application Priority Data

Oct. 24, 1986 [CH] Switzerland .................. 4243/86

[51] Int. Cl.⁴ .............................................. G02B 6/44
[52] U.S. Cl. ................................ 350/96.23; 174/139; 174/177
[58] Field of Search .................. 350/96.23; 174/139, 174/177

[56] References Cited

U.S. PATENT DOCUMENTS

| | | | |
|---|---|---|---|
| 3,746,424 | 7/1973 | Hermstein | 350/96.23 |
| 4,392,714 | 7/1983 | Brüggendieck et al. | 350/96.23 |
| 4,610,033 | 9/1986 | Fox, Jr. | 350/96.23 X |
| 4,717,237 | 1/1988 | Austin | 350/96.23 |

FOREIGN PATENT DOCUMENTS 3046042  7/1982  Fed. Rep. of Germany ... 350/96.23
3207306  9/1983  Fed. Rep. of Germany ...... 174/177
60-158402  8/1985  Japan ..................... 174/139

Primary Examiner—John D. Lee
Attorney, Agent, or Firm—Oblon, Fisher, Spivak, McClelland & Maier

[57] ABSTRACT

In a high-voltage-conducting assembly (10), such as, for example, the current transducer arrangement for a high-voltage outdoor installation, measurement information items are transmitted via optical waveguides from high-voltage potential to ground potential. To reduce the voltage gradient along the optical waveguide, the latter is spirally conducted along an optical waveguide carrier (7) between the high-voltage side (9) and the ground potential side (5) of a high-voltage insulator (6). The optical waveguide support (7) can be a self-supporting plastic coil (7) or the outer layer of the insulator tube of fibre-glass-reinforced plastic of the high-voltage insulator (6) or its silicon layer applied on the outside or its silicon shield tape. In this arrangement, the surface leakage path of the optical waveguide support is greater than 1.5-times, preferably greater than 5-times the height (h) of the high-voltage insulator (6). The optical waveguide can be wound at a steep pitch onto the coil or arranged in a U-shaped groove of the coil or in the hollow space of a hose-spaced coil.

12 Claims, 3 Drawing Sheets

OPTICAL WAVEGUIDE ARRANGEMENT FOR A HIGH-VOLTAGE INSULATOR

BACKGROUND OF THE INVENTION

1. Field of the Invention

The invention is based on an optical waveguide arrangement for a high-voltage insulator according to the introductory clause of claim 1.

2. Discussion of Background

A conventional optical waveguide arrangement for a high-voltage insulator is known from DE-A1-No. 34 26 536. There optical waveguides are attached, mechanically protected, in a straight line and uncoiled, to a cylindrical support element having a surface of limited electrical conductivity. The support element is permanently arranged at an insulator column filled with an insulating agent. The optical waveguides are conducted hermetically sealed through the insulator column. A coiling of the optical waveguide is considered to be disadvantageous in this case for mechanical and transmission reasons.

Optical waveguide arrangement for a highvoltage insulator, in which arrangement the voltage gradient along the optical waveguide between the high-voltage side and the ground potential side of the high-voltage insulator is reduced.

An advantage of the invention consists in the fact that the electric strength of the optical waveguide, which is normally relatively low in comparison with that of the high-voltage insulator, is compensated by the greater length of the optical waveguide. If glass fibers are used for the optical waveguides, transmission losses on the transmission path through the high-voltage insulator are negligible.

By providing a relative long surface leakage path i.e., 5 times greater than the height of the insulator, the voltage gradient is reduced to a greater extent.

In a preferred embodiment, the optical waveguide is wound at a steep pitch around an insulating coil located in the hollow space of the insulator. An advantage of the coil in the embodiment consists in the fact that its end terminations can fulfil several functions. In the upper termination or sealing end, an optical waveguide, which is of sufficient length for the high-voltage-conducting assembly, with optical waveguide connector can be accommodated. In the lower termination or terminal box, couplings for the fibre-optic output of the high-voltage-conducting assembly can be attached.

Alternatively, the optical waveguide can be arranged in a recess of groove in the coil or in a hollow coil to ensure good and positionally stable guidance of the optical waveguide.

If a flexible tube is used as coil, the possibility exists of drawing a universal optical waveguide to the required coil length. When the high-voltage insulator is ventilated, a self-supporting coil without vertical supports has the advantage of greater flashover strength.

Further, the optical waveguide can be embedded in the insulator tube which provides the advantage that his is done during the production of the insulator tube so that the optical waveguide is spirally conducted from one end to the other end of the insulator tube in one of the upper layers of the insulator tube.

In another implementation, the optical waveguide is embedded in an additional silicon layer on the insulator tube, which has the advantage that the bearing cross-section of the insulator tube is not reduced.

Advantageously, the silicon layer is provided with an optical waveguide recess in which that the optical waveguide can be subsequently inserted.

Providing the optical waveguide recess on the underside of the silicon shield enables the optical waveguide to be simply pressed in, which has a self-holding effect after completion of the high-voltage insulator.

The developments of the invention in which the optical waveguide is embedded in the insulator tube or in the above-noted silicon layer to have the common advantage that the optical waveguide does not come into contact with the medium (oil, sulfur hexafluoride $SF_6$, foam) present in the interior of the high-voltage insulator. The axial voltage stress can be controlled by the pitch of the winding spiral. There are no optical waveguide related transitions in the interior space of the high-voltage insulator which could create sealing problems. There is also the common advantage that the optical waveguide is protected against external influences such as moisture and mechanical damage by the fibre-glassreinforced plastic and silicon layer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
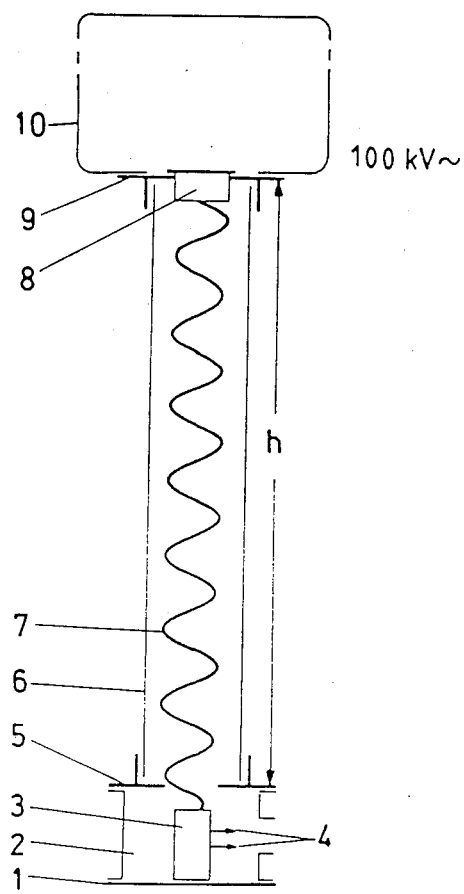
FIG. 1 shows a current transducer arrangement for a highvoltage outdoor installation with a self-supporting coil in the cavity of the high-voltage insulator.

Referring now to the drawings, wherein like reference numerals designate identical or corresponding parts throughout the several views, in FIG. 1, a vertical tubular air-filled or ventilated high-voltage insulator of ceramic or fibre-glass-reinforced plastic is designated by 6 which stands outdoors on a base 2 with a bottom plate 1 via a metallic bottom flange 5 which is at ground potential. At the upper end, the high-voltage insulator 6 is closed off by a metallic high-voltage flange 9 which carries a high-voltage-conducting assembly 10, preferably a transducer head housing with a current transducer. In the hollow space of the high-voltage insulator 6, a self-supporting coil 7 of a plastic with good electric insulation is located which is supported at the bottom on a terminal box 3 with optical waveguide couplings 4. At the upper end of the coil 7, a sealing end 8 for attaching the coil to the high-voltage insulator 6 and for accommodating an optical waveguide or optical waveguide cable with several optical waveguides is provided. At the end of the optical waveguides, optical waveguide connectors are mounted for coupling the optical waveguides to electronics, not shown, of the high-voltage-conducting assembly 10. To ensure high flashover strength, the coil 7 does not exhibit any vertical supports.

Figure 2:
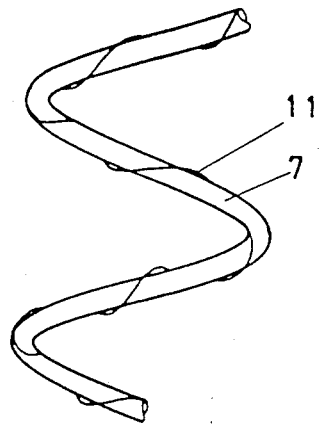
FIG. 2 shows a section of a coil according to FIG. 1 with wound-on optical waveguide.

As can be seen from FIG. 2, the coil 7 can have a circular cross-section. Around the coil 7, an electrically insulating optical waveguide cable with several glass fibres or one or several glass fibre optical waveguides 11, not cabled, is or are wound at a steep pitch, the length of the optical waveguide 11 being preferably equal to 10 times h within a height h of the high-voltage insulator 6. This reduces the voltage stress of the optical waveguide 11 at a ratio of 1:10 and as a result the voltage gradient along the optical waveguide 11 is sufficiently small. The optical waveguide 11 transfers information in the form of light pulses, generated by the high-voltage-conducting assembly 10, into a protected test room, not shown, at ground potential or commands in the reverse direction.

Figure 3:
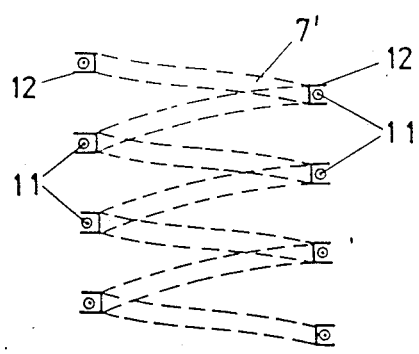
FIG. 3 shows a section of a coil according to FIG. 1 in cross-section with U-shaped groove for accommodating an optical waveguide.

Instead of a coil 7 having a round section, a coil 7' with U-shaped section 12 can also be used as indicated in Figure 3. In this arrangement, the optical waveguide 11 is placed into the longitudinal groove of this U-shaped section 12.

Figure 4:
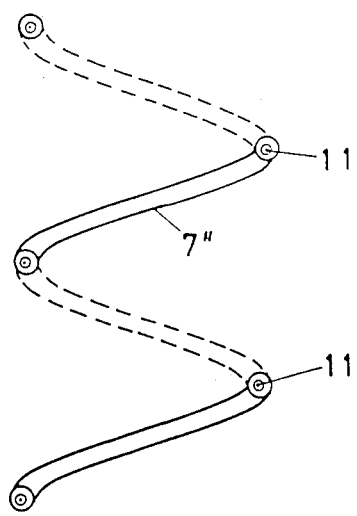
FIG. 4 shows a section of a hose-shaped coil according to FIG. 1 having in its interior an optical waveguide.

A tubular coil 7" can also be used, cf. FIG. 4, into which the optical waveguide 11 can be drawn. The tube of the coil 7" should not be hermetically sealed in order to ensure an exchange of medium (gas, air) between the internal space of the high-voltage insulator 6 and the hollow space of the coil 7".

The coil 7 or 7', 7" with terminal box 5 and sealing end 8 form a separate constructional unit which is mounted into the finished high-voltage insulator 6. The high-voltage insulator 6 can thus consist of several prefabricated part pieces with intermediate flanges, not shown, without any problems of continuity of the optical waveguide guidance occurring. If a coil 7 or 7', 7" of a flexible material is used, the possibility exists of drawing a universal optical waveguide to the required coil length.

Naturally, the high-voltage insulator 6 can also be hermetically sealed, if required, and filled with an insulating gas such as nitrogen or sulfur hexafluoride $SF_6$.

In this arrangement, the bottom flange 5 is hermetically sealed to the terminal box 3 and the high-voltage flange to the sealing end 8.

Figures 5, 6, 7:
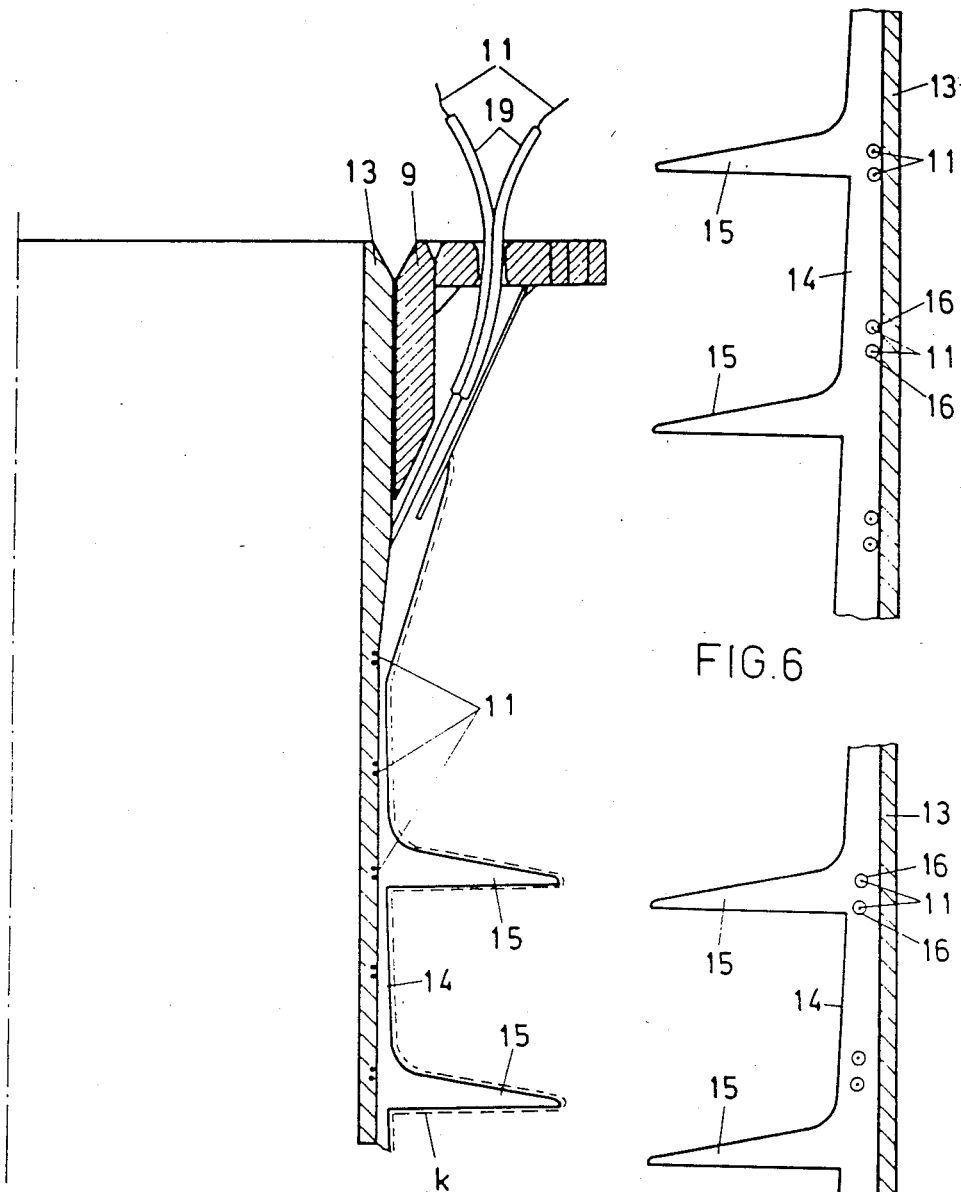
FIG. 5 shows a section of a cross-section through a high-voltage insulator according to FIG. 1 with an insulator tube, optical waveguides embedded therein, a silicon layer with silicon shields, applied on the outside, and with a high-voltage flange.
FIG. 6 shows a section of a cross-section through a high-voltage insulator according to FIG. 1 in which the optical waveguides are wound onto the insulator tube.
FIG. 7 shows a section of a cross-section with a high-voltage insulator according to FIG. 1 with an insulator tube and a silicon layer, applied thereto, with optical waveguides embedded therein.

FIG. 5 shows a section of a high-voltage insulator 6 according to FIG. 1 with an insulator tube 13 of fiber-glass-reinforced plastic, into the outer layer of which optical waveguides 11 are spirally embedded during the production of the insulating tube 2 and are conducted from one end to the other end of the insulator tube.

The places of emergence of the optical waveguide 11 lead to the outside close to the lower and upper or high-voltage flange 9. The free ends of the optical waveguides 11 are conducted, protected by electrically insulating strain-relief hoses 19, through openings in the lower and upper flange 9 and are provided at their ends with optical waveguide connectors, not shown. During the shielding of the insulator tube 13, the short transition of the optical waveguides 11 from the insulator tube 13 into the flange 9 is covered with a silicon layer 14 which exhibits silicon shields 15 for extending a surface leakage path k indicated with dashes.

In the embodiments according to FIGS. 6 and 7, optical waveguide cables 16 with optical waveguides 11 located therein are either spirally wound onto the outside of the insulator tube 13 and subsequently embedded into the silicon layer 14 cast thereon (FIG. 6) or completely enveloped by the silicon layer 14 (FIG. 7).

Figure 8:
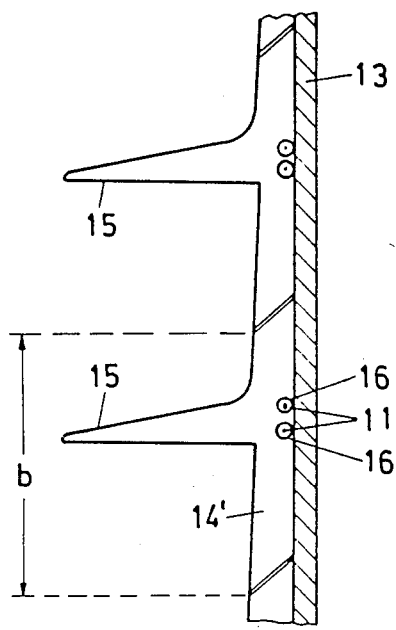
FIGS. 8 and 9 show sections of a cross-section through a high-voltage insulator according to FIG. 1 with an insulator tube and a silicon shield tape wound thereon with optical waveguide arrangements according to FIGS. 6 and 7.
Figure 9:
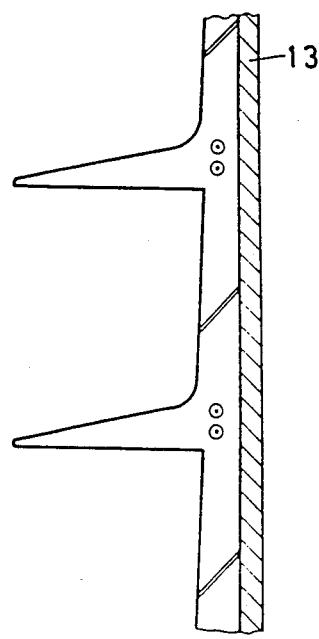

In the embodiments according to FIGS. 8 and 9, optical waveguide czbles 16 with optical waveguides 11 are embedded into an endless silicon shield tape 14 which is spirally wound onto the insulator tube 13 in such a manner that the optical waveguide cable either rests against the insulator tube 13 (FIG. 8) or is completely enveloped by the silicon (FIG. 9). The silicon shield tape 14' exhibits a width b and a silicon shield 15.

Figure 10:
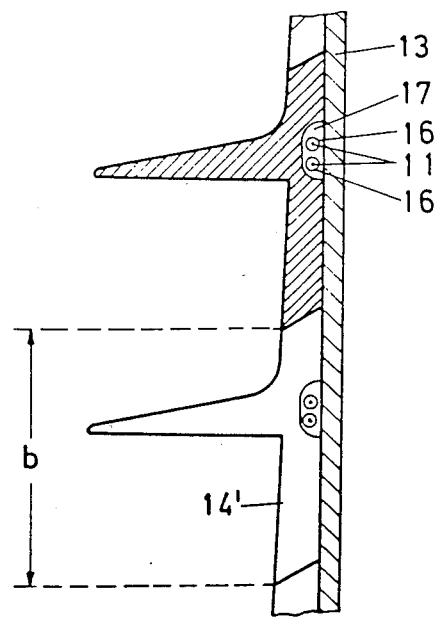
FIG. 10 shows a section of a cross-section through a high-voltage insulator according to FIG. 1 with a recess, extending spirally along the surface of the insulator tube, for accommodating optical waveguides

In the embodiment according to FIG. 10, two optical waveguide cables 16 with optical waveguides 11 are subsequently drawn into a recess 17 in the silicon shield tape 14' adjoining the surface of the insulator tube 13.

Figure 11:
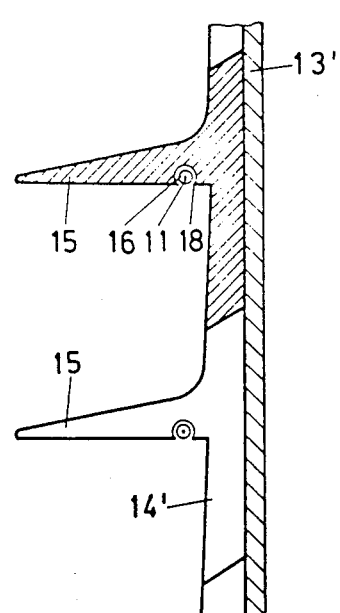
FIG. 11 shows a section of a cross-section through a high-voltage insulator according to FIG. 1 with recesses on the undersides of the silicon shields for clamping accommodation of an optical waveguide.

In the embodiment according to FIG. 11, an optical waveguide cable 16 with an optical waveguide 11 is pressed, after the silicon shield tape 14' has been wound on, into a recess 18 on the underside of the silicon shield 15 in which it is held by self-holding effect.

In the abovementioned embodiments, the optical waveguide guidance is positionally very well-defined and reproducible. The axial voltage stress is controllable by the pitch of the winding spiral. The less well-defined geometry of the optical waveguide guidance in the vicinity of the flanges 5 and 9 is already in a zone in which the voltage gradient has been reduced to a low value due to external control electrodes. Due to the spiral guidance, the optical waveguide 11 is subject to only very little mechanical stress even with severe bends in the insulator.

In all variants according to FIGS. 5 to 11, it is also possible to embed instead of the optical waveguide 11, a tube of electrically insulating material in the fiber-glass-reinforced plastic or in the silicon and to draw in the optical waveguide 11 only after completion of the high-voltage insulator.

Using a tube brings the additional following advantages:
the optical waveguide 11 is not subjected to any high temperatures during production-related thermal treatments of the insulator tube 13,
the optical waveguide 11 can be exchanged, an additional optical waveguide 11 can be drawn in, the optical waveguide 11 is even better protected in the tube, the space around the optical waveguide 11 can be ventilated, the optical waveguide is not subjected to any mechanical stresses.

We claim:

1. Optical waveguide arrangement for a high-voltage insulator, particularly for a current transducer of a high-voltage outdoor installation, comprising:
   (a) at least one optical waveguide which leads from a high-voltage side of the high-voltage insulator to its low-voltage side;
   (b) an optical waveguide support around which the at least one optical waveguide is spirally conducted;
   (c) the optical waveguide support having a surface leakage path (k) the length of which is greater than 1.5-times the height (h) of the high-voltage insulator; and
   said support comprising an insulating coil and the at least one optical waveguide being conducted positionally stably through said insulating coil, which is located in the hollow space of the high-voltage insulator, the optical waveguide wound around said coil with a steep pitch.

2. Optical waveguide arrangement as claimed in claim 1, wherein the optical waveguide support exhibits a surface leakage path (k) the length of which is greater than 5-times the height (h) of the high-voltage insulator.

3. Optical waveguide arrangement as claimed in claim 2, wherein the coil comprises a self-supporting elastic material.

4. Optical waveguide arrangement as claimed in claim 1 or 2, wherein:
   at least one groove is provided along the ocil for accommodating at least one optical waveguide.

5. Optical waveguide arrangement as claimed in claim 4, wherein the coil comprises a self-supporting elastic material.

6. Optical waveguide arrangement as claimed in one of claims 1 or 2, wherein:
   the coil is hollow; and
   at least one optical waveguide is arranged in the hollow space of the coil.

7. Optical waveguide arrangement as claimed in claim 6, wherein the coil comprises a self-supporting elastic material.

8. Optical waveguide arrangement as claimed in claim 1 or 2, wherein:
   (a) the high-voltage insulator comprises an insulator tube of fiber-glass-reinforced plastic,
   (b) at least one optical waveguide is embedded in this insulator tube and
   (c) conducted spirally at least into the vicinity of the two ends of the high-voltage insulator,
   (d) in particular, the at least one optical waveguide is embedded into an outer layer of the insulator tube.

9. Optical waveguide arrangement as claimed in claim 1 or 2, wherein:
   (a) the high-voltage insulator comprises an insulator tube of fiber-glass-reinforced plastic,
   (b) the insulator tube comprises on its outer surface a silicon layer with silicon shields spaced apart from one another at a vertical distance or a silicon shield tape with silicon shields and
   (c) at least one optical waveguide is embedded at least partially into this silicon layer or into this silicon shield tape so that it either rests against the outside wall of the insulator tube or is fully surrounded by the silicon of the silicon layer or of the silicon shield tape.

10. Optical waveguide arrangement as claimed in claim 1, wherein the coil comprises a self-supporting elastic material.

11. Optical waveguide arrangement for a high-voltage insulator, particularly for a current transducer of a high-voltage outdoor installation, comprising:
   (a) at least one optical waveguide which leads from a high-voltage side of the high-voltage insulator to its low-voltage side;
   (b) the at least one optical waveguide being spirally conducted along an optical waveguide support;
   (c) the optical waveguide support having a surface leakage path (k) the length of which is greater than 1.5-times the height (h) of the high-voltage insulator;
   (d) the high-voltage insulator comprising an insulator tube of fiber-glass-reinforced plastic;
   (e) the insulator tube comprising on its outer surface a silicon layer with silicon shields spaced apart from one another at a vertical distance or a silicon shield tape with silicon shields; and
   (f) at least one optical waveguide being embedded at least partially into said silicon layer or into said silicon shield tape so that it either rests against the outside wall of the insulator tube or is fully surrounded by the silicon of the silicon layer or of the silicon shield tape.

12. Optical waveguide arrangement as claimed in claim 11, wherein the optical waveguide support exhibits a surface leakage path (k) the length of which is greater than 5-times the height (h) of the high-voltage insulator.

* * * * *